United States Patent [19]

Sarnacki et al.

[11] 3,795,358

[45] Mar. 5, 1974

[54] IMMERSION SOLDER LEVELING APPARATUS USING ULTRASONIC CAVITATION

[75] Inventors: Frank H. Sarnacki, Johnson City; Robert V. Steenstrup, Binghamton, both of N.Y.

[73] Assignee: International Business Machines Corporation, Armonk, N.Y.

[22] Filed: Dec. 11, 1972

[21] Appl. No.: 314,079

[52] U.S. Cl. .................... 228/19, 29/470.1, 29/557, 134/1, 134/107, 228/1, 228/20

[51] Int. Cl. .................... B23k 1/00

[58] Field of Search ........ 228/1, 19, 20; 134/1, 105, 134/107, 184; 29/470.1, 557

[56] References Cited

UNITED STATES PATENTS

| | | | |
|---|---|---|---|
| 3,210,182 | 10/1965 | Funari | 228/19 UX |
| 3,249,281 | 5/1966 | St. Jean | 228/1 X |
| 3,491,779 | 1/1970 | McLain et al. | 228/20 X |
| 3,498,303 | 3/1970 | Eaves et al. | 134/105 X |
| 3,603,329 | 9/1971 | White et al. | 134/107 |

FOREIGN PATENTS OR APPLICATIONS

| | | | |
|---|---|---|---|
| 223,172 | 4/1968 | U.S.S.R. | 228/19 |

OTHER PUBLICATIONS

IBM Technical Disclosure Bulletin, Removal Of Soldered Components, E. N. Rose, Vol. 6, No. 12, May 1964, pp. 78 & 79.

*Primary Examiner*—J. Spencer Overholser
*Assistant Examiner*—Robert J. Craig
*Attorney, Agent, or Firm*—Charles S. Neave

[57] ABSTRACT

A method and apparatus utilizing ultrasonic cavitation to level molten solder on wetted surfaces to a controlled and a predetermined thickness. By immersing a surface soldered substrate, printed circuit card, printed circuit board or the like into a heated tank containing a liquid glycerol at approximately 10° C. to 40° C. above the melting point of the solder, it is possible to selectively and ultrasonically cavitate solder from the soldered surfaces to achieve uniform solder thickness.

4 Claims, 1 Drawing Figure

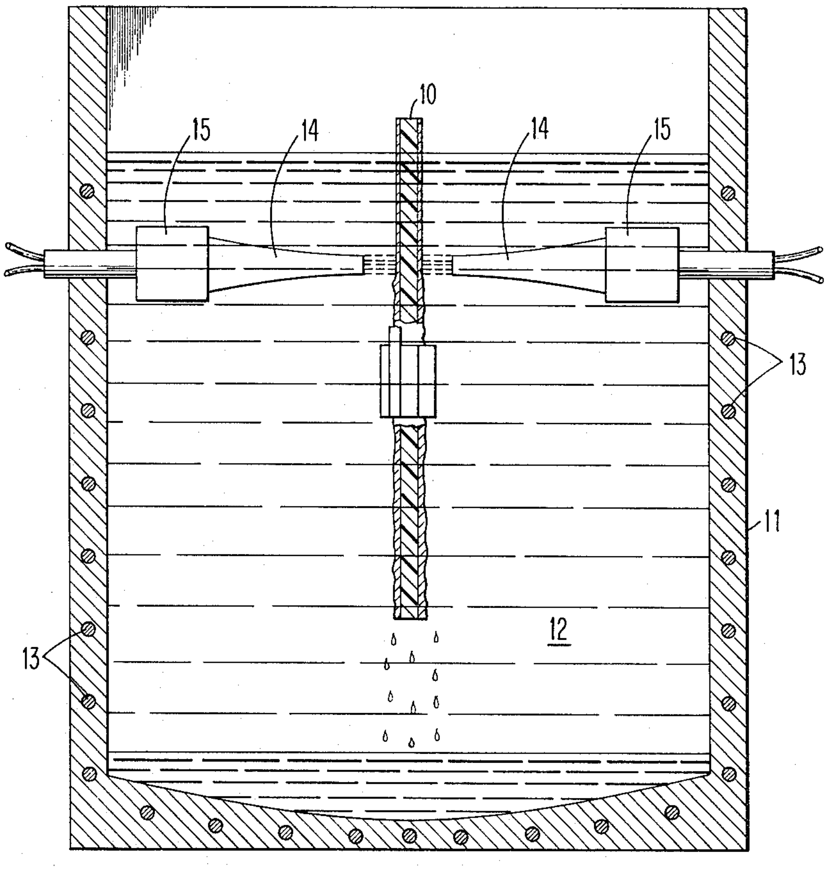
10
15
14
14
15
13
11
12
13

IMMERSION SOLDER LEVELING APPARATUS USING ULTRASONIC CAVITATION

BACKGROUND OF THE INVENTION

1. Field of the Invention

This invention relates to solder leveling and in particular, to the method and apparatus adapted for the production line leveling of soldered surfaces on items that are immersed into a tank of a controllably heated glycerol and pass through a submerged cavitational beam within the glycerol which is ultrasonically created and functions to achieve a controlled and uniformly thick layer of solder joined to the item surface.

2. Description of the Prior Art

Various techniques are commonly used in modern day soldering of product items, as for example, substrates having printed circuit patterns attached thereto, printed circuit cards or boards or the like having a plurality of components that are to be securely attached thereto, such as by a solder joining. The volume of solder, which in a molten state, that will adhere to a circuit and/or metallic pad area varies with the surface geometry. In the present day circuit packaging technologies, as the densities of the circuit devices are increased and the packaging areas and volumes are decreased, the thickness or height of the solder above the surface areas can become critical and, consequently, the solder thickness must be controlled within extremely narrow limits for hot tip soldering of wires, component lead joining, and chip attachment to the electrical pad areas. It is important from a cost viewpoint that the means of applying solder and controlling the thicknesses of the soldered areas be consistent with the repeated reflow processes and capable of being performed with a minimum number of processing steps.

In U.S. Pat. No. 2,671,264, there is disclosed an improved method of soldering simultaneously all of the connections of an assembly which includes a plurality of electrical conductors disposed on a surface of electrically insulating material and including a process step for removal of the excess solder that usually remains adhered to the electrically insulating surface and between the conductors. The solder removal process requires the assembly to be immersed in a bath of molten material and including an upper or top layer of a relatively inert organic liquid which may be selected from a class consisting of oils, waxes, and resins which are thermally stable between about 400° F. and 600° F. The assembly is exposed to and preferably manipulated in the bath until substantially all the solder adhering to the insulating material surface is removed therefrom.

Various soldering apparatus and methods employ high frequency vibration to form cavitation in the molten solder flowing against the electrical portions of printed circuit boards and the like. For example, U.S. Pat. No. 3,084,650 relates to a soldering system for automatically soldering joints in an assembly line process and which includes ultrasonic generating means to impart energy to a standing wave. The ultrasonic energy effects a proper cleaning of the joints. Further, U.S. Pat. No. 3,303,983 relates to soldering apparatus inducing ultrasonic energy to produce cavitation to remove oxides from surfaces and areas to be soldered to improve the wetting of the exposed metals. However, we are unaware of any teachings which relate to the inducing of ultrasonic energy to produce cavitation for the purpose of removing excess solder and controlling the thickness of solders on a printed circuit board.

SUMMARY OF THE INVENTION

The method and apparatus for solder leveling in accordance with the present invention overcomes disadvantages of any prior known constructions. It includes features and advantages of providing a cavitational beam system submerged in a temperature controlled glycerol bath and employing ultrasonic agitation in a manner adapted to remove excess solder to a uniform and predetermined thickness.

Briefly, the apparatus comprises a tank containing a bath of controllably preheated glycerol, preferably of a glycerol such as 1,2,3-Propanetriol, at about 10° C. to 40° C. above the melting point of the solder. Ultrasonically driven horn apparatus is adapted to provide a cavitational beam system immediately below the surface of the temperature controlled glycerol bath. Ultrasonic energy is induced in the 10 to 40 KHz range to produce cavitation and with a calculated movement of a soldered substrate through the cavitational area to thereby remove excess solder from the previously soldered substrate and to achieve a controlled and predetermined thickness of solder which remains attached to the substrate. An additional capability of the system includes the selective removal of molten solder from plated-through-holes in the substrate without damage thereto.

In the process, a printed circuit substrate with components soldered in place is mounted in a fixture such that the soldered surface faces the ultrasonic horn apparatus. The fixture containing the substrate is lowered into the tank until completely submerged and preheated whereupon the ultrasonic agitation is commenced. The substrate is then moved at a predetermined rate in the vicinity of the horn apparatus. The excess solder is removed to a predetermined thickness remaining upon the substrate. The fixture and substrate are then removed from the bath.

It is a primary object of the present invention to provide an improved solder leveling apparatus including a cavitational beam system adatped for submersion and operation in a preheated glycerol bath.

It is an object of the present invention to provide solder leveling apparatus for ultrasonically cavitating the soldered surface of a printed circuit substrate or the like.

It is another object of the present invention to provide a submersible cavitating system adapted to strip excess solder from a soldered substrate and to a uniform controlled thickness.

The foregoing and other objects, features and advantages of the invention will be apparent from the following more particular description of the preferred embodiment of the invention, as illustrated in the accompanying drawing.

BRIEF DESCRIPTION OF THE DRAWING

FIGURE is a showing of apparatus for solder leveling of printed circuit substrates in accordance with the present invention.

DESCRIPTION OF THE PREFERRED EMBODIMENT

Referring to the drawing, there is shown a solder leveling apparatus adapted for the processing of printed circuit substrates 10, cards, boards, or the like and including a tank 11. Within the tank 11 is a solder leveling bath 12 of glycerol, preferably of 1,2,3-Propanetriol, or the equivalent thereof. The 1,2,3-Propanetriol is used because of the favorability of physical properties, namely, solubility, ecology, safety to health, does not decompose, cost, etc. The walls and bottom of the tank 11 are equipped with heating coils 13 and with automatic controls (not shown) which function to maintain the temperature of the glycerol leveling bath 12 at about 10° to 40° C. above the temperature melting point of the solder alloy used to effect the solder joining in its molten state. Submerged in the leveling bath 12 and mounted immediately below the surface of the bath are one or more ultrasonic horns 14. The horns 14 are driven by an ultrasonic vibrator 15 operating in the 10 to 40 KHertz range. The vibrator 15 may be of any suitable type such as is made by Branson Sonic Power Company, or an equivalent thereof. Electrical ultrasonic power is provided by a suitable source (not shown) to each of the horns 14 through suitable amplitude and phase controls coupled with the vibrator unit 15.

The present invention employs ultrasonic cavitation in the 10 to 40 KHertz range to level molten solder on the wetted surfaces of a printed-circuit substrate 10 to a predetermined thickness. By initially providing the wetted surfaces with adequate solder volume, it is possible to achieve uniformity in solder height from pad to pad area over the entire surface of the printed circuit substrate 10 or within selected regions on that surface.

Since the cavitating intensity varies with the ultrasonic horn 14 to solder surface distance of the printed circuit substrate 10, an inherent selective extraction of the solder occurs with a resultant capability of solder leveling to a uniform thickness in the region covered by the cavitational beam. Leveling solder to a predetermined thickness from pad to pad area over the substrate surface or within selected regions of that surface becomes a matter of system parameter control. Those parameters considered important to the process while the printed circuit substrate traverses the horn 14 in a fixed planar path normal to the cavitating beam are: (1) power intensities in watts per inch/square, (2) ultrasonic horn to substrate distance measured in inches, (3) the frequency in kilohertz, (4) the substrate withdrawal rate in feet per minute, and (5) the horn depth below the surface of the liquid.

Exemplary of experimental operations, solder leveling parameters as follows were used:

| | | | |
|---|---|---|---|
| Horn size | ½"×2" | ⅜"×6" | 1"×2" |
| Horn area (inches$^2$) | 1 | 2.25 | 2 |
| Booster | 2.5 | 2.5 | 1.5–2.5 |
| Power (watts) | 90–300 | 300–500 | 175–360 |
| Power (watts/inch$^2$) | 90–300 | 133–221 | 87.5–180 |
| Temperature (°F.) | 270–300 | 300 | 300 |
| Substrate speed (inches/minute) | 6–17 | 17 | 17 |
| Gap (inches) | 0.24–0.35 | 0.4–0.7 | 0.4–0.7 |
| Horn immersion depth (inches) | 0.150 | 0.4–1.15 | 0.4–1.15 |
| Angle of incidence relative to horn | | 30° | |

The number of ultrasonic horns 14 required to process any particular substrate varies with the width of the substrate 10 area to be leveled. In such applications where the substrate 10 width exceeds that of the horn 14, it is necessary that two or more horns 14 arranged in a bank will be required in order to level the desired regions in a minimum number of passes. This arrangement of banked horns introduces a sixth process parameter, namely, the spacing between the horns 14 measured in inches.

An additional capability for the apparatus of the present invention includes the removal or cleaning of molten solder from plated-through-holes without damage to the printed circuit substrate 10 or the plated surfaces thereof. Solder leveling by ultrasonic cavitation is believed to be a unique process and, by comparison with known prior art apparatus, represents a significant reduction in processing cost to present and contemplated product processing programs.

While the invention has been particularly shown and described with reference to a particular embodiment thereof, it will be understood by those skilled in the art that various changes in form and details may be made therein without departing from the spirit and scope of the invention.

What we claim is:

1. Apparatus for solder leveling printed circuit cards comprising, in combination:

a. a tank, b. a liquid glycerol solution disposed within the tank, c. heating means disposed about the walls of said tank and operative for maintaining the temperature of said glycerol solution at predetermined temperatures, d. a system of cavitating apparatus including a plurality of horns disposed within said liquid glycerol solution, e. a carrier fixture adapted to supporting a printed circuit card, f. means for moving said carrier fixture into and out of the liquid glycerol solution at a predetermined rate, and g. means for ultrasonically energizing said cavitating apparatus to remove excess solder from a soldered surface of the printed circuit card to obtain a predetermined solder coat thickness.

2. Apparatus for solder leveling printed circuit cards as defined in claim 1 wherein the horns of said cavitating apparatus are disposed immediately beneath the surface of said glycerol solution.

3. Apparatus for solder leveling printed circuit cards as defined in claim 2 wherein the moving means for said carrier fixture moves the printed circuit card transversely in the vicinity of said horns.

4. Apparatus for solder leveling a printed circuit card substrate comprising:

a. a container, b. a liquid glycerol solution disposed within the container, c. heating means disposed about the periphery of said container, d. control means operative for maintaining the temperature of said glycerol solution at a predetermined temperature, e. cavitating apparatus including at least one horn disposed immediately beneath the surface of said liquid glycerol solution, f. a carrier fixture for supporting a printed circuit card substrate, g. means for moving said carrier fixture into and through the glycerol solution and in the vicinity of the horn at a predetermined rate, and h. means for ultrasonically energizing said cavitating apparatus in order to remove excess solder from the soldered surface of the printed circuit substrate to effect the stripping of excess solder and achieve a predetermined solder coat thickness on said printed circuit substrate.

* * * * *